United States Patent [19]

Imhof et al.

[11] Patent Number: 5,297,824
[45] Date of Patent: Mar. 29, 1994

[54] SPIGOT-AND-SOCKET JOINT SECURED AGAINST SLIDING

[75] Inventors: Erich Imhof, Laufach; Karl-Heinz Bergmann, Hoesbach; Manfred Vorbeck, Laufach, all of Fed. Rep. of Germany

[73] Assignee: Eisenwerke Fried. Wilh. Dueker GmbH & Co., Karlstadt, Fed. Rep. of Germany

[21] Appl. No.: 961,272

[22] Filed: Oct. 15, 1992

[30] Foreign Application Priority Data

Oct. 15, 1991 [DE] Fed. Rep. of Germany ....... 4134089

[51] Int. Cl.⁵ ............................................. F16L 21/06
[52] U.S. Cl. ..................................... 285/322; 285/374
[58] Field of Search .................... 285/322, 323, 4, 104, 285/105, 232, 337, 231, 374, 230, 233, 234, 379

[56] References Cited

U.S. PATENT DOCUMENTS

| 2,116,705 | 5/1938 | Marx et al. | 285/374 X |
| 2,596,182 | 5/1952 | Sosaya | 285/3 |
| 3,384,392 | 5/1968 | Gilchrist | 285/105 |
| 3,843,169 | 10/1974 | Wise | 285/322 X |
| 3,899,183 | 8/1975 | Wild et al. | 285/231 X |
| 3,963,298 | 6/1976 | Seiler | 285/231 X |
| 4,045,055 | 8/1977 | Blakely | 285/33 |
| 4,212,486 | 7/1980 | Logsdon | 285/4 |
| 4,293,149 | 10/1981 | Bond | 285/322 X |
| 4,623,170 | 11/1986 | Cornwall | 285/4 |
| 4,641,858 | 2/1987 | Roux | 285/231 X |
| 4,805,932 | 2/1989 | Imhof et al. | 285/4 |

FOREIGN PATENT DOCUMENTS

| 2105144 | 9/1971 | Fed. Rep. of Germany | 285/231 |
| 2034325 | 1/1972 | Fed. Rep. of Germany | 285/105 |
| 7517728 | 10/1975 | Fed. Rep. of Germany. | |
| 2754984 | 6/1979 | Fed. Rep. of Germany | 285/105 |
| 3541837 | 6/1987 | Fed. Rep. of Germany | 285/231 |
| 3607268 | 9/1987 | Fed. Rep. of Germany. | |
| WO8705087 | 8/1987 | PCT Int'l Appl.. | |

Primary Examiner—Dave W. Arola
Attorney, Agent, or Firm—Jacobson, Price, Holman & Stern

[57] ABSTRACT

The spigot-and-socket joint which is secured against sliding is designated for moulded parts and for socket pipes (1) produced by the centrifugal casting technique, with the spigot end (3) of the one pipe adapted to be slid, with radial play, into the socket end (2) of the other pipe. In the socket end there are arranged a sealing ring (8) and a separate clamping ring (14) comprising a plurality of circumferentially extending, spaced clamping segments (15) having a spherically convex outer surface (17) and, on their inner surface (18), a tooth system (19) which, in the presence of axial forces, presses radially onto the spigot end (3) as the spherically convex surface (17) cooperates with a pipe socket's inner surface (18) which tapers conically towards the end. An elastomer support member (20), which can be fixed in its position at the socket face end and supports the same, is provided on the clamping ring (14). A form, which ensures proper retention also in the case of increased rated widths, is obtained when the support member's annular disk-shaped portion (23), which bears on the socket front face (22), comprises a reinforced transition region (26) of increased flexural strength in the region of the inner edge of the socket front face, with the portion (24) connecting to the clamping ring (14) issuing therefrom, and when the socket front face (22) has at its inner edge a recess matching the cross section of the reinforced transition region (26). There a steel ring (28), which increases the flexural strength and can be optionally inserted via an axial insertion slit (29), is cooperating with the reinforced transition region (26) of the support member.

6 Claims, 1 Drawing Sheet

SPIGOT-AND-SOCKET JOINT SECURED AGAINST SLIDING

TECHNICAL FIELD

The present invention relates to a spigot-and-socket joint which is secured against sliding, in particular for moulded components manufactured by centrifugal casting techniques, in which joint the spigot end of the one pipe is adapted to be slid, with radial play, into the socket end of the other pipe, wherein a sealing ring and a separate clamping ring are arranged in the socket end, with the clamping ring composed of a plurality of clamping segments spaced in the circumferential direction, which clamping segments have a convex outer surface, are joined in the circumferential direction by a vulcanization-bonded intermediate layer of rubber or the like, and have on their inner surface a tooth system radially pressing against the spigot end by the convex surface cooperating with a distally conically tapering inner surface of the pipe socket when axial forces are present, wherein an elastomeric support member adapted to be affixed to the socket's front face and supporting the same is moulded onto the clamping ring, which support member comprises an annular disk portion bearing against the socket's front face and an approximately conically tapering connecting portion extending from the inner edge of the socket's front face up to the clamping ring, with the connecting portion being adapted to be widened together with the clamping ring in dependence upon the outer dimensions of the spigot end to be introduced and to be stretched in the axial direction on this occasion.

BACKGROUND OF THE INVENTION

In a known spigot-and-socket joint of this type (EP 0 235 818 B1), wherein the annular disk portion and the ensuing expansible connecting portion which in the support member leads to the clamping ring have approximately the same thickness, despite the support member's annular cylinder portion contacting the outside of the socket end, there turned out to be disadvantageous the fact that, especially in the case of socket pipes of large rated widths, affixing the support member at the socket's end during the assembly operation results in problems because of the clamping segments' tendency to separate, by their weight, the entire support member from the socket's end. Furthermore, it turned out that when the pipe ends are slid into each other, the spigot end of the one pipe end often pulls fully or partly the annular-disk-shaped portion, which bears against the socket front face, around the socket edge located at the inner edge of the socket front face into the region between the spigot end and the socket via the support member's approximately conically tapering connecting portion, which includes the spigot end, under the influence of the resultant high axial load.

SUMMARY OF THE INVENTION

The problem underlying the invention is to configure the spigot-and-socket joint of the above-identified type in such a way that, with a relatively simple design, the support member of the clamping ring with its clamping segments can be positively affixed to the inner face of the socket before and during insertion of the spigot end into the socket.

The spigot-and-socket joint according to the invention, which is secured against sliding and with which the above problem is solved, is basically characterized in that the annular disk portion bearing against the socket face has, in the region of the inner edge of the socket front face, a reinforced transition region of increased flexural strength, from which region the portion connecting to the clamping ring issues, and that the inner edge of the socket front face has a recess region matching the cross section of the reinforced transition region.

With this configuration of the support member, on the one hand, and of the pipe socket, on the other, prior to plugging the pipes together, the clamping ring of socket pipes to be joined and having rated widths "NW" as high as 600 to 1000 can be fixed without the risk of any unintentional separation at the socket front face. Moreover, it is ensured that while the spigot end of the one pipe is pushed into the socket end of the other pipe, the reinforced transition region, which is supported by the matchingly configured recess region of the socket front face, prevents the support member's region bearing on the socket front face from being pulled around the socket edge located at the inner edge of the socket front face and into the region between the spigot end and the socket. Furthermore, it turned out that in many instances, on the collar provided on the support member of the conventional spigot-and-socket joints, one can do without the ring-cylindrical portion which contacts the outside of the socket end. In this way there is eliminated the risk of damage to the support member in this collar region, which damage often occurred when socket pipes provided with the conventional support member had to be stacked one above the other during temporary storage or when they had to be handled and pushed into each other at the point of use, i.e., during laying out along the planned route.

In regard to ensure positional retention of the support member at the socket during assembly, in an other embodiment of the spigot-and-socket joint it proved to be particularly expedient to associate a steel ring, which increases flexural strength, with the reinforced transition region.

This steel ring can be bonded by vulcanization in the reinforced transition region, i.e., together with the support member it can form a module. However, in regard to manufacture it proved to be particularly advantageous to associate with the steel ring an axial insertion slit provided in the reinforced transition region. In this way the steel ring can be inserted into the reinforced transition region prior to assembly and, if necessary, can be removed after joining successive socket pipes by pushing the spigot end of the one pipe into the socket end of the other pipe.

In an other embodiment, a particularly good retention of the steel ring increasing flexural strength in the transition region can be ensured by making the width of the insertion slit smaller than the diameter of the steel ring.

The transition region can be configured in some other way. In order to provide stability and flexural strength, it is particularly advantageous for the reinforced transition region of the support member to have approximately triangular cross section and to adapt the inner edge of the recess region of the socket front face by an approximately conical chamfer to the cross section of the transition region.

According to an other embodiment, it proved to be advantageous when the reinforced transition region of the support member has approximately rectangular cross section and the recess region of the socket front face is adapted by a step on the inner edge to the cross section of the reinforced transition region of the support member.

BRIEF DESCRIPTION OF THE DRAWINGS

Other details, advantages, and features of the invention will be apparent from the following description and the drawing to which reference is explicitly made in regard to the disclosure of any details not described in the specification. There show FIG. 1, a section of the spigot end of a pipe with the applied socket end of the adjoining pipe.

DETAILED DESCRIPTION OF PREFERRED EMBODIMENTS

Figure 1:
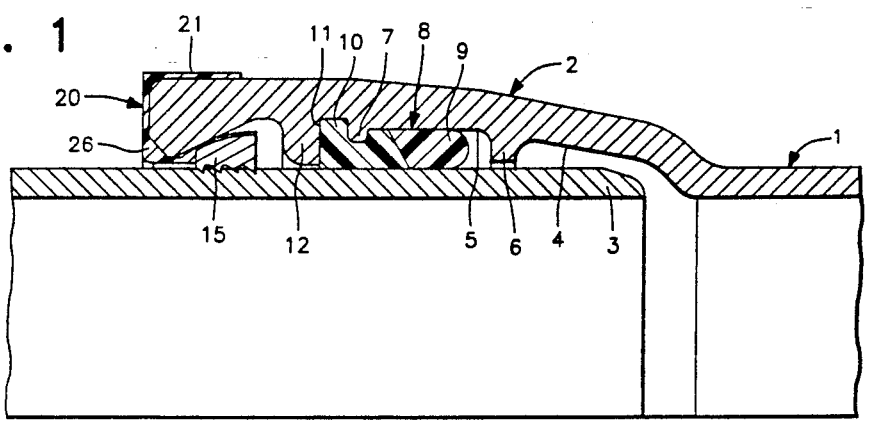

The drawing shows that the socket pipe 1 has at its end, the socket end 2, a socket into which the spigot end 3 of an adjoining socket pipe 1 can be inserted with radial play. In the interior of the socket there is provided a recess 4 which facilitates relative swivelling of the pipe 1 within specific limits. Following this recess there is formed a sealing chamber 5 one end of which is bounded by a radially extending internal shoulder 6 of socket end 2. An annular bead 7 is spaced from internal shoulder 6 within sealing chamber 5. This bead serves to fix the position of a sealing ring 8 which has a head portion 9 of a softer elastomeric material and a foot portion 10 of a harder elastomeric material. This foot portion 10 is situated in an annular groove 11 which is bounded by the annular bead 7, on the one hand, and a support shoulder 12, on the other, with the shoulder also forming a boundary to the other end of sealing chamber 5. In this way the position of the sealing ring 8 is fixed and the sealing ring is kept in its position even when the spigot end 3 is introduced into the socket end 2 under deformation of the head portion 9. Between the support shoulder 12 and the front face of socket end 2 there is a locking chamber 13 which serves to accommodate a clamping ring 14. The clamping ring 14 is composed of a plurality of circumferentially extending spaced clamping segments 15. In the circumferential direction the clamping segments 15 are interconnected by an intermediate layer of rubber or the like, bonded by vulcanization. On the side facing the locking chamber 13, each of the clamping segments 15 has a spherically convex outer surface 17. The same cooperates with the pipe socket's inner surface 18 conically tapering toward the end, i.e., in the presence of axial forces, it is pressed radially onto the spigot end 3 by means of the tooth system 19 provided on the inner surface of the clamping segments 15.

As shown in the drawing, onto the clamping ring 14 there is applied an elastomeric support member 20 which is adapted to be attached to the socket front face and supports the same. In the embodiment shown in FIG. 1, this support member 20 comprises a ring-cylindrical portion 21 contacting the outside of socket end 2, an adjacent annular disk-shaped portion 23 contacting the socket front face 22, and a connecting portion 24 which extends from the inner edge of the socket front face to the clamping ring 14 and, in the unstressed state, tapers approximately conically. Depending upon the outer dimensions of the spigot end 3 to be inserted, the same [connecting portion] is adapted to be widened together with the clamping ring 14 and is expansible in the axial direction so that it finally assumes the widened shape shown in the drawing.

It also follows from the drawing that on the spherically convex outer surface 17 of the clamping ring 14, which faces the conically tapering inner surface 18 of the socket end, the connecting portion 24 of the support member 20 is provided with an insulating coating 25 which serves to electrically insulate the joined pipes from each other. This coating 25 can be formed by an enamel layer or a fibre-glass-reinforced plastic material layer, but is preferably formed by an elastomeric layer.

Figure 2:
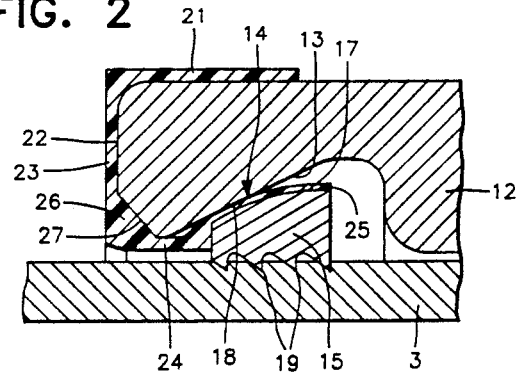
FIG. 2, a portion of FIG. 1, on an enlarged scale.

It also follows from the drawing that in the embodiment according to FIGS. 1 and 2, but also in the modified embodiments according to FIGS. 3 to 6, the annular disk-shaped portion 23, which contacts the socket front face 22, comprises a reinforced transition region 26 of increased flexural strength at inner edge of the socket front face 22, with the portion 24 connecting with clamping ring 14 issuing from the transition region. The socket front face 22 has on the side of its inner edge a recess region 27 which matches the cross section of the reinforced transition region 26. These simple measures ensure that proper functioning of the support member 20 of the clamping ring with its clamping segments 15 at the inner surface 13 of the socket is ensured both before and during insertion of the pipe's spigot end into the socket, particularly in spigot-and-socket joints of large rated widths. This is guaranteed by the increaesed flexural strength resulting from the reinforced transition region 26. The latter also prevents the support member's portion bearing against the socket front face 22 from being pulled around the socket edge and into the region between the spigot end and the socket.

Figure 3:
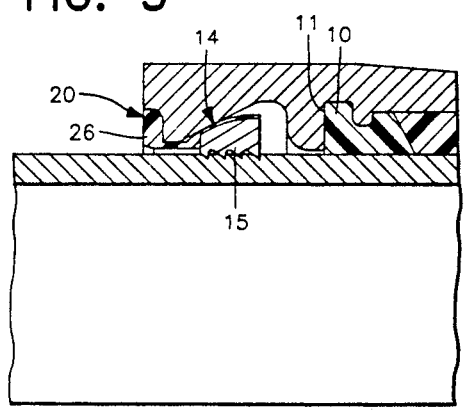
FIG. 3, a section of a modified embodiment.
Figure 4:
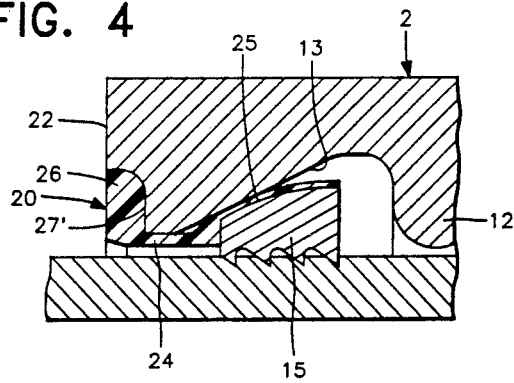
FIG. 4, a portion of FIG. 3, on an enlarged scale.

This advantage is also achieved with the embodiment according to FIGS. 3 and 4, wherein the reinforced transition region 26 has an approximately rectangular cross section rather than an approximately triangular cross section like the embodiment according to FIGS. 1 and 2. The recess region of the socket front face is formed by a step 27' on the side of the inner edge rather than by the approximately conical taper 27 of the embodiment according to FIGS. 1 and 2. In this case one can do without the outer region of the annular disk-shaped portion 23 which is followed by the ring-cylindrical section 21 bearing against the outside of the socket end as per FIGS. 1 and 2. Thus, the latter is redundant, and this facilitates handling the pipes without the risk of damage to the support member during pipe laying and more particulary in the stacking of socket pipes provided with the support member/clamping ring unit.

Figure 5:
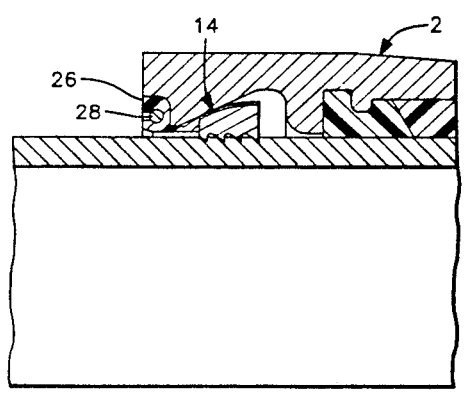
FIG. 5, an other embodiment.
Figure 6:
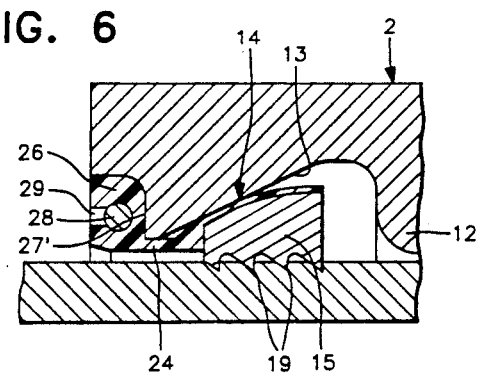
FIG. 6, a portion of FIG. 5, on an enlarged scale.

Especially in support member/clamping ring units for socket pipes of large rated widths, it is advantageous, in an other embodiment as per FIGS. 5 and 6, to associate a steel ring 28, which increases the flexural strength, with the reinforced transition region 26 of the support member. In the reinforced transitioin region 26 there is provided for this steel ring 28 an axial insertion slit 29 through which the steel ring can be inserted, if necessary, and removed again. Especially good retention is ensured when the width of insertion slit 29 is chosen smaller than the diameter of the steel ring 28.

We claim:

1. A spigot-and-socket joint secured against sliding, for moulded components and for socket pipes (1) produced by a centrifugal casting technique, wherein a spigot end (3) of one pipe is fitted, with radial play, into a socket end (3) of another pipe, said socket end having a front face, an inner edge and having an inner surface conically tapering toward said front face in a diverging manner wherein a sealing ring (8) and a separate clamping ring (14) are arranged in the socket end, with the clamping ring (14) composed of a plurality of circumferentially extending, spaced clamping segments (15) which have a convex outer surface (917), joined in a circumferential direction by a vulcanization-bonded intermediate layer, and which each have an inner surface (18) with a tooth system (19) radially pressing against the spigot end (3) and which by the convex surface (17) cooperate with said conically tapering inner surface (18) of the pipe socket when axial forces are present, wherein an elastomeric support member (20) is affixed to a front face of the socket and is applied onto the clamping ring (14), which support member comprises an annular disk-shaped portion (23) bearing against said front face (22) and an approximately conically tapering connecting portion (24) extending from an inner edge of said front face (22) to the clamping ring (14), with the connecting portion (24) being adapted to be widened together with the clamping ring (14) in dependence upon the outer dimensions of the spigot end (3) and to be stretched in the axial direction, characterized in that the annular disk-shaped portion (23) bearing against said front face (22) has, in a region of the inner edge of the front face (22), a reinforced transition region (26) of increased flexural strength, from which region the connecting portion (24) extends, and that the inner edge of the front face (22) has a recess region matching the cross section of the reinforced transition region (26).

2. The spigot-and-socket joint according to claim 1, characterized in that a steel ring (28) for increasing the flexural strength is associated with the reinforced transition region (26) of the support member.

3. The spigot-and-socket joint according to claim 2, characterized in that an axial insertion slit (29) located in the reinforced transition region (26) is associated with the steel ring (28).

4. The spigot-and-socket joint according to claim 3, characterized in that the width of the insertion slit (29) is smaller than the diameter of the steel ring (28).

5. The spigot-and-socket joint according to claim 1, characterized in that the reinforced transition region (26) of the support member has approximately a triangular cross-section and that the recess region of the socket front face matches the cross section of the transition region (26) of the support member by way of an approximately conical taper (27).

6. The spigot-and-socket joint according to claim 1, characterized in that the reinforced transition region (26) of the support member has an approximately rectangular cross section and that the recess region of the socket front face matches the cross section of the reinforced transition region (26) of the support member by way of a step (27') on the side of the inner edge.

* * * * *